United States Patent Office 2,793,776
Patented May 28, 1957

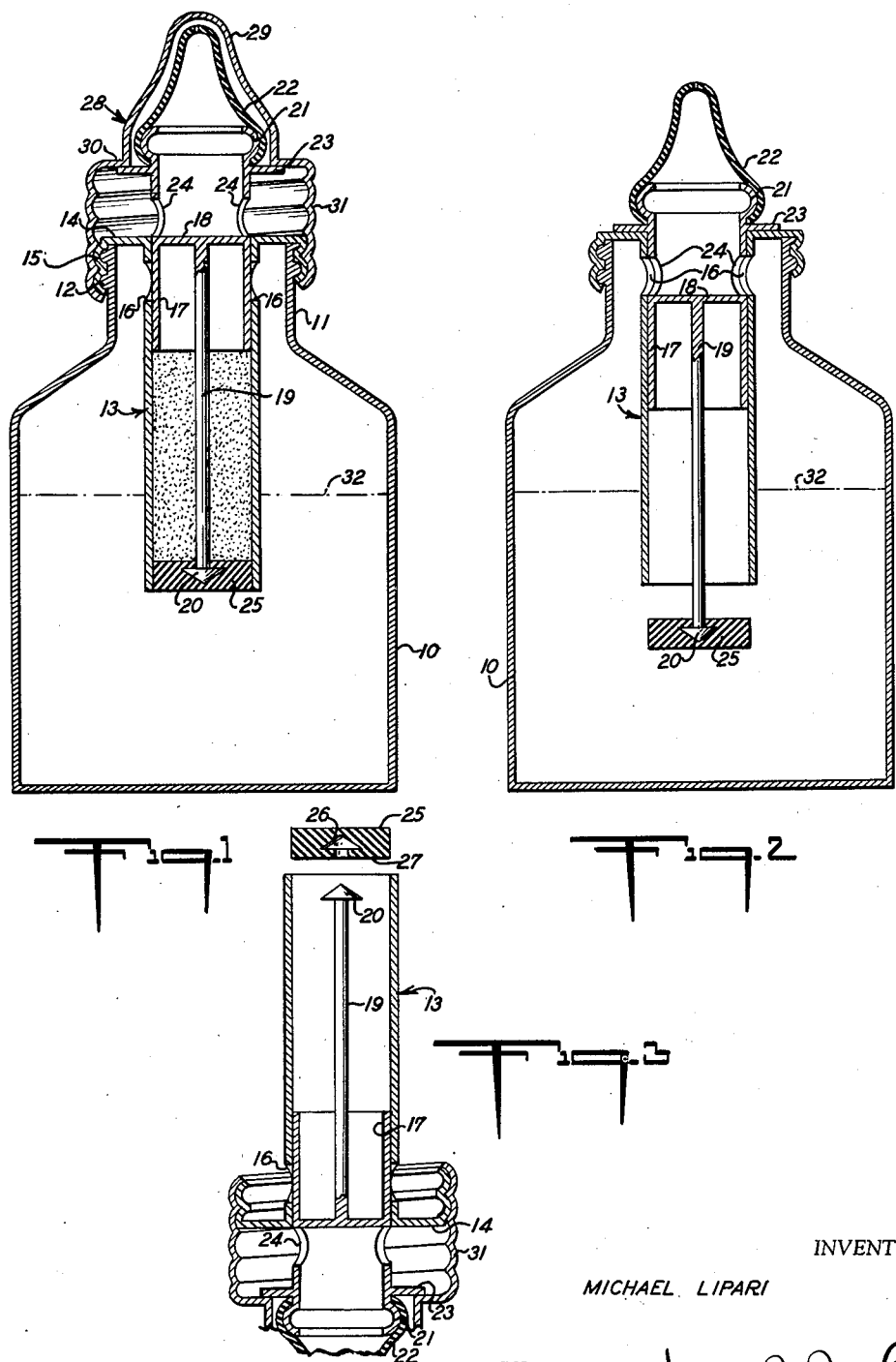
INVENTOR
MICHAEL LIPARI

2,793,776

CONTAINER ATTACHMENT FOR PROVIDING A COMPARTMENTAL DISPENSING RECEPTACLE

Michael Lipari, Oneonta, N. Y.

Application May 23, 1956, Serial No. 586,791

8 Claims. (Cl. 215—6)

This invention relates to the storage and dispensing of materials and more particularly to a container attachment for providing a compartmental receptacle in the compartments of which ingredients of a mixture may be kept in separated condition and thereafter mixed within the receptacle and dispensed as desired.

The attachment of this invention may be utilized with any container having a threaded neck of an appropriate size and application of the attachment of this invention to such a container will provide a compartmental dispensing receptacle which is primarily intended to store infants' food in which milk in powdered or condensed form may be contained in one compartment and a suitable diluent may be contained in the other compartment. Means is provided for preventing mixing of the contents of the compartments prior to the intended use thereof and there is also provided on the attachment of this invention a dispensing nipple which may be utilized for subsequent dispensing of the contents after suitable mixing.

Heretofore, numerous compartmental receptacles have been proposed and utilized, but the majority of these required a special container or receptacle and did not suggest an attachment which might be used with a conventional container, such as a glass bottle or jar which might normally be found in the home. Furthermore, these prior art compartmental receptacles did not provide a unitary dispensing means, such as a nipple and after mixing of the contents, it was necessary either to transfer the same to a special nursing bottle or to apply a nipple or other dispensing means to the compartmental receptacle. In the instant invention, a nipple may be supplied as a unit with the attachment and since, a shield for the same is provided, the nipple may be pre-sterilized and, if desired, the attachment of this invention may be utilized once and then discarded. However, upon suitable cleaning and sterilization, the attachment of this invention may, of course, be utilized as often as desired.

It is accordingly an object of this invention to provide a container attachment which may be utilized in connection with a conventional container to provide a compartmental dispensing receptacle, which attachment may be economically and conveniently manufactured from readily available materials and in which the same is completely self-contained and does not require the removal or addition of elements in order to carry out the complete mixing and dispensing operation.

A further object of the invention is the provision of an attachment for a container which provides a compartmental dispensing receptacle having two compartments for receiving ingredients to be mixed and in which such compartments are separated by a removable stopper in order to provide adequate sealing between such compartments prior to mixing of the contents thereof.

A still further object of the invention is the provision of an attachment for a container to provide a compartmental dispensing receptacle in which the compartment provided by the attachment may be conveniently filled with a suitable material, such as powdered milk or the like, and such compartment thereafter closed by a stopper.

Another object of the invention is the provision of an attachment for a container to provide a compartmental dispensing receptacle, including a dispensing nipple and in which means is provided to prevent mixing of the contents of the compartments and in which means is further provided to prevent communication between the compartments and the nipple prior to dispensing of a mixture of the materials.

A further object of the invention is the provision of an attachment for a container to provide a compartment dispensing receptacle and in which there is included a dispensing nipple and a nipple shield and actuating member which may be utilized to establish communication between the compartments of the receptacle and, at the same time, to establish communication between one of the compartments and the dispensing nipple.

A still further object of the invention is the provision of an attachment for a container to provide a compartmental dispensing receptacle and in which such attachment is applied to the container by cooperating screw threads on the container neck and the attachment.

Further objects and advantages of the invention will be apparent from the following description taken in conjunction with the accompanying drawing wherein:

Fig. 1 is a sectional view of a container attachment constructed in accordance with this invention and applied to a conventional container and with the parts in position to prevent mixing of the contents of the two compartments provided;

Fig. 2 is a sectional view, similar to Fig. 1, but showing the parts in a position to permit mixing of the contents of the two compartments; and Fig. 3 a fragmentary sectional view of the attachment of this invention in inverted position preparatory to filling the same and showing the removable stopper for the compartment which is inserted after such filling.

With continued reference to the drawing, there is shown a conventional container 10, such as a glass bottle or jar and having a reduced neck portion 11 provided with external screw threads 12 thereon adjacent the upper end. The container 10 and neck portion 11 thereof may be of any desired size or shape, so long as the same is suitable to receive the screw threaded portion of the attachment of this invention.

The container attachment of this invention may well comprise a tubular body 13 terminating at the upper end in a flange 14 and from such flange 14, there may be depended a threaded skirt 15 of a size and configuration suitable for threadedly engaging the threads 12 on the neck portion 11 of the container 10. Apertures 16 are provided in the wall of the body 13 adjacent and below the flange 14 and slidably disposed in the body 13 is a hollow plunger 17 having a partition 18 disposed substantially midway of the length thereof. A rod 19 may be formed integral with the partition 18 or secured thereto in any desired manner and, such rod 19 depends within the body 13 and terminates in an enlarged head 20, the purpose of which will be presently described.

The portion of the hollow plunger 17 above the partition 18 terminates in a bead 21 which serves to receive and hold a dispensing nipple 22 and immediately below the bead 21, there is provided on the plunger 17 an annular flange 23, the purpose of which will be presently described. The sidewall of the plunger 17 above the partition 18 is also provided with apertures 24 and the purpose and operation of such apertures will presently appear.

A stopper 25 of yieldable material may be provided for the lower end of the body 13 and the stopper 25 is provided with a recess 26 therein, which is open at the inner surface 27 of the stopper 25 and which recess 26 is complementary to the enlarged head 20 on the rod 19. Since, the stopper 25 is formed of yieldable material, the same may be applied to and removed from the head 20 of the rod 19 merely by snapping the head 20 into the recess 26, which due to the configuration of the head 20 and recess 26 will retain the stopper 25 on the rod 19 until the same is forcibly removed therefrom.

An actuating member and nipple shield 28 of plastic, metal or any other suitable material may be provided and this actuating member and nipple shield 28 may well be provided with a nipple shield portion 29 which terminates in a shoulder 30 engaging the annular flange 23, as shown in Fig. 1, and depending from the shoulder 30 is a threaded shell or skirt 31 which threadedly engages the skirt 15 depending from the flange 14 on the body 13.

In operation, the container 10 may be filled with a suitable diluent, such as water or any other liquid to a level indicated by the line 32 or to any other desired level and the body 13 of the attachment of this invention may be filled with milk in powdered or condensed form, or with any other desired material, by inverting the same to the position shown in Fig. 3, and with the stopper 25 removed from the body 13, a desired quantity of the material is placed therein. The stopper 25 is then inserted in the end of the body 13, thus effectively sealing the body 13 and prevent the removal of the contents thereof until desired. It is also to be noted, that the nipple shield and actuating member 28 is already applied in position over the nipple 22 and with the threaded shell 31 engaging the threaded skirt 15 on the body 13 and after filling of the body, it is only necessary to apply to the container 10 by threadedly engaging the threaded skirt 15 with the threads 12 on the neck portion 11 of the container 10. It will thus be seen, that there has been provided a compartmental receptacle with the body 13 of the attachment of this invention suspended within the container 10 and with the contents of the container 10 and the body 13 completely separated by the stopper 25, in which condition the contents may remain until it is desired to mix and dispense the same.

When it is desired to mix the contents of the container 10 and body 13 preparatory to dispensing the same, it is only necessary to rotate the nipple shield and actuating member 28 to move the same downwardly on the skirt 15 of the body 13, at which time the shoulder 30 will engage the annular flange 23 on the plunger 17 and move the same downwardly within the body 13. Downward movement of the plunger 17 will result in moving the stopper 25 out of the body 13 to the position shown in Fig. 2, thereby permitting the contents of the body 13 to flow into the contents of the container 10 and, at the same time, the apertures 24 in the plunger 17 will move into registry with the apertures 16 in the body 13 thereby providing communication between the interior of the container 10 and the interior of the nipple 22. After suitable mixing of the contents in the container 10, the same may be inverted and such contents may then be dispensed through the nipple 22, it, of course, being understood, that prior to the dispensing operation, the nipple shield and actuating member 28 is removed from the attachment as clearly shown in Fig. 2. After dispensing of the contents of the container 10, the body 13 comprising the attachment of this invention may be discarded, or if desired, the stopper 25 may be removed from the rod 19 and the body 13 refilled with material and the body again applied to the container 10, as described above.

It will be seen that by the above described invention there has been provided a relatively simple, yet highly effective attachment for a conventional container which will serve to provide a compartmental dispensing receptacle which is especially useful in providing the ingredients for infant feeding and also providing for keeping these ingredients separated until just prior to use when the same may be mixed and dispensed merely by operation of the one device. Obviously, the attachment of this invention may be conveniently and economically manufactured from readily available materials and at a cost which will permit sale of the same in a highly competitive market and which, if desired, would permit discarding the same after a single use without the cost thereof becoming excessive.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An attachment for the screw threaded neck of a container, said attachment comprising a tubular body terminating at one end in a flange, a threaded skirt depending from the periphery of said flange for threaded engagement with the threaded neck of a container with said body suspended in said container, apertures in the sidewall of said body adjacent said flange, a hollow plunger slidably disposed in said body, a partition in said plunger substantially midway of the length thereof, a rod fixed to said partition and depending therefrom within said body, said rod terminating in an enlarged head, a stopper of yieldable material closing the opposite end of said body, a recess in said stopper receiving said head to detachably secure said stopper to said rod, apertures in the sidewall of said plunger above said partition, said plunger terminating at the upper end in a bead for receiving a dispensing nipple, an annular flange on said plunger adjacent said bead, a screw threaded actuating member and nipple shield disposed over a nipple secured to said bead and threadedly engaging said skirt and a shoulder in said actuating member engaging the upper surface of said annular flange whereby upon rotation of said actuating member to move the same downwardly on said skirt said shoulder will engage said annular flange to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

2. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body adjacent said flange, a hollow plunger slidably disposed in said body, a partition in said plunger, a rod fixed to said partition and depending therefrom within said body, said rod terminating in an enlarged head, a stopper of yieldable material closing the opposite end of said body, a recess in said stopper receiving said head to detachably secure said stopper to said rod, apertures in the sidewall of said plunger above said partition, said plunger terminating at the upper end in a bead for receiving a dispensing nipple, an annular flange on said plunger adjacent said bead, a screw threaded actuating member and nipple shield disposed over a nipple secured to said bead and threadedly engaging said skirt and a shoulder in said actuating member engaging the upper surface of said annular flange whereby upon rotation of said actuating member to move the same downwardly on said skirt said shoulder will engage said annular flange to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

3. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body adjacent said flange, a hollow plunger slidably disposed in said body, a partition in said plunger, a rod fixed to said partition and depending therefrom within said body, said rod terminating in an enlarged head, a stopper of yieldable material closing the opposite end of said body, a recess in said stopper receiving said head to detachably secure said stopper to said rod, apertures in the sidewall of said plunger above said partition, said plunger terminating at the upper end in means for receiving a dispensing nipple, an annular flange on said plunger, a screw threaded actuating member and nipple shield disposed over a nipple secured to said plunger and threadedly engaging said skirt and a shoulder in said actuating member engaging the upper surface of said annular flange whereby upon rotation of said actuating member to move the same downwardly on said skirt said shoulder will engage said annular flange to move said plunger downwardly within said body to register the apertures in said plunger with the apertures in said body and move said stopper out of said body to permit the mixing of the contents of said body with the contents of said container and upon removal of said actuating member the mixture may be dispensed through said apertures, said plunger and said nipple.

4. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body adjacent said flange, a hollow plunger slidably disposed in said body, a partition in said plunger, a rod fixed to said partition and depending therefrom within said body, a stopper closing the opposite end of said body, means in said stopper to detachably secure the same to said rod, apertures in the sidewall of said plunger above said partition, said plunger terminating at the upper end in means for receiving a dispensing nipple, an annular flange on said plunger, a screw threaded actuating member and nipple shield disposed over a nipple secured to said plunger and threadedly engaging said skirt and a shoulder in said actuating member engaging the upper surface of said annular flange whereby upon rotation of said actuating member to move the same downwardly on said skirt said shoulder will engage said annular flange to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

5. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body adjacent said flange, a hollow plunger slidably disposed in said body, a partition in said plunger, a rod fixed to said partition and depending therefrom within said body, a stopper closing the opposite end of said body, means in said stopper to detachably secure the same to said rod, apertures in the sidewall of said plunger above said partition, said plunger terminating at the upper end in means for receiving a dispensing nipple, an annular flange on said plunger, an actuating member and nipple shield disposed over a nipple secured to said plunger and a shoulder in said actuating member engaging the upper surface of said annular flange whereby upon movement of said actuating member downwardly said shoulder will engage said annular flange to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

6. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body, a hollow plunger slidably disposed in said body, a partition in said plunger, a rod fixed to said plunger and depending therefrom within said body, a stopper closing the opposite end of said body, means in said stopper to detachably secure the same to said rod, apertures in the sidewall of said plunger above said partition, said plunger terminating at the upper end in means for receiving a dispensing nipple, an annular flange on said plunger, an actuating member and nipple shield disposed over a nipple secured to said plunger and a shoulder in said actuating member engaging the upper surface of said annular flange whereby upon movement of said actuating member downwardly said shoulder will engage said annular flange to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

7. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body, a hollow plunger slidably disposed in said body, a partition in said plunger, a rod fixed to said plunger and depending therefrom within said body, a stopper closing the opposite end of said body, means in said stopper to detachably secure the same to said rod, apertures in the sidewall of said plunger above said partition, said plunger terminating at the upper end in means for receiving a dispensing nipple, a projection on said plunger, an actuating member and nipple shield disposed over a nipple secured to said plunger and a shoulder in said actuating member engaging said projection whereby upon movement of said actuating member downwardly said shoulder will engage said projection to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

8. An attachment for the screw threaded neck of a container, said attachment comprising a tubular body terminating at one end in a flange, a threaded skirt depending from said flange for threaded engagement with the threaded neck of a container with said body suspended in said container, apertures in the sidewall of said body, a hollow plunger slidably disposed in said body, a partition in said plunger, a rod fixed to said plunger and depending therefrom within said body, a stopper closing the opposite end of said body, means in said stopper to detachably secure the same to said rod, apertures in the sidewall of said plunger above said partition, a projection on said plunger, an actuating member and nipple shield disposed over a nipple secured to said plunger and a shoulder in said actuating member engaging said projection whereby upon movement of said actuating member downwardly said shoulder will engage said projection to move said plunger downwardly within said body to register the apertures in said plunger with the apertures in said body and move said stopper out of said body to permit mixing of the contents of said body with the contents of said container and upon removal of said actuating member the mixture may be dispensed through said apertures, said plunger and said nipple.

No references cited.